Patented Aug. 2, 1938

2,125,374

UNITED STATES PATENT OFFICE 2,125,374

POLYMERIZED VINYL COMPOUNDS

Willy O. Herrmann, Deisenhofen, and Wolfram Haehnel, Munich, Germany, assignors to Chemische Forschungsgesellschaft m. b. H., Munich, Germany, a corporation of Germany No Drawing. Application May 13, 1936, Serial No. 79,622. In Germany June 5, 1935

9 Claims. (Cl. 18—57)

This invention relates to polymerized vinyl compounds, and more particularly, to the insolubilizing or hardening of polyvinyl alcohol and its water-soluble derivatives.

An object of this invention is to provide a method for modifying the chemical and physical properties of normally water-soluble polymerized vinyl compounds. A further object is to provide compositions and articles comprising water-soluble polymerized vinyl compounds which are superior to those known heretofore in hardness, tenacity, durability, and resistance to chemical and mechanical action. Further objects and advantages of the invention will be evident from the ensuing description of the invention.

We have found that the properties of polyvinyl alcohols of various degrees of polymerization and their partially saponified esters, ethers, and acetals, i. e., those that have been saponified to such an extent that they swell or dissolve in water, or mixtures of these materials with or without additions of other kinds, can be modified to a surprising degree by subjecting the compositions to the action of insolubilizing agents. By such treatment the viscosity, elasticity, tenacity, impermeability to gases, vapors, and liquids, resistance to tearing, bending, and to the action of water and organic solvents can be increased to a surprising extent. Furthermore, the modifications in these properties can be effected to any desired degree, depending upon the particular insolubilizing agents used and the conditions of treatment.

As examples of suitable insolubilizing agents for carrying out the process of the invention may be mentioned particularly metal compounds and organic dyes. Particularly suitable metal compounds are the salts of metals and metaloid acids, e. g., iron chloride; salts of metal acids such as chromates and especially dichromates; and free metal acids such as chromic acid. As examples of suitable organic dyestuffs, may be mentioned the azo dyes and particularly Congo red. As the insolubilizing action of most of these insolubilizing agents depends to some extent upon photocatalytic activity, the insolubilizing process may be augmented or modified as desired by exposure to light, application of heat, etc.

In the following examples certain preferred embodiments of the invention are set forth in detail, it being understood that the specific procedures and compositions described therein are merely illustrative, as the invention broadly comprehends all such modifications and variations as fall within the scope of the appended claims.

Example 1.—A film of polyvinyl alcohol is immersed for one minute in a 4% solution of potassium dichromate. It is then removed from the dichromate, washed with water for 10 seconds, and allowed to stand in the sunlight for a few minutes. The resultant film is characterized by increased resistance to water, insolubility in various organic solvents, increased tenacity, elasticity, hardness, resistance to tearing, impermeability to gases, vapors and liquids, and resistance to the action of chemical agents and heat. The insolubilized film is not wetted on contact with water.

The degree and extent of the insolubilizing action obtained depends upon the particular insolubilizing agent used, its concentration, and its method of application. Chromic acid, for example, has a considerably stronger action than dichromate. Duplicate experiments with 2.5% and 5% chromic acid solutions indicate that the action of the 5% solution is considerably more than double that of the 2.5% solution. As a result of the insolubilizing action the film becomes more or less colored.

If desired, the insolubilizing action may be effected on only one side of an article such as a film, tube, or the like. This mode of application is of advantage in the treatment of polyvinyl alcohol fabrics which are used for special garments of various kinds. For example, the outside surface of a protective garment may be rendered extremely resistant to water and organic solvents, while the inner side retains its ability to take up moisture. The process is obviously applicable, not only to films and textile fabrics coated with films on one or both sides, but also to formed objects in general, such as fibers, tubes (particularly flexible tubes for conveying fluid materials), molded objects of all kinds, phonograph records, and safety glass which is provided with a film of polyvinyl alcohol or its derivatives upon one surface. The process may likewise be utilized for insolubilizing the exposed edges of laminated safety glass of the type composed of two or more sheets of glass with an intermediate layer of polyvinyl alcohol or its derivatives.

The process of the invention can also be carried out by contacting solutions, suspensions, or pastes of polymerized vinyl compounds with the insolubilizing agent.

Example 2.—A flexible tube, composed of 25% polyvinyl alcohol and 75% softening agents and fillers, when immersed in boiling water for 3 minutes became swollen and completely deformed. Another tube of the same composition was immersed for 1 minute in a 5% chromic acid solution, washed with water for 15 seconds, and placed in diffused sunlight for half an hour. When the tube thus treated was suspended in boiling water, no swelling or deformation took place within the 3 minutes.

The hardened outer surface of the tube resembled leather in appearance and to the touch. The leather-like outer layer was not in the form of a distinct separable skin but merged gradually into the basic mass and was integral with the remainder of the tube wall.

Flexible tubing prepared in accordance with the method of Example 2 is extremely resistant to the action of alcohol, benzene, and oils and, in addition, possesses outstanding mechanical properties which render it of great utility for conveying fluids of all types, particularly those of a corrosive nature. Tubes of this kind have been found to be of particular value for conveying cutting oils which have an extremely deleterious action on rubber and other types of flexible tubing used heretofore.

*Example 3.*—In a 9% aqueous solution of a highly polymerized polyvinyl alcohol, 1% of ferric chloride was dissolved. During the course of solution the viscosity of the polyvinyl alcohol solution increased about four-fold. Within a few hours the solution had solidified to the consistency of a gel.

*Example 4.*—A 10% aqueous solution of a low viscosity polyvinyl alcohol was mixed with an equal volume of an aqueous solution of Congo red. The viscosity of the solution steadily increased upon standing until, after two days, the solution had solidified to a solid mass.

*Example 5.*—The process of Example 4 was carried out using a solution of high viscosity polyvinyl alcohol. In this case a solid mass resulted 5 minutes after mixing the solutions.

*Example 6.*—A 1% aqueous solution of Congo red was carefully poured in a separate layer over a 10% solution of high viscosity polyvinyl alcohol. At the interface of the two liquids there was formed a water-resistant film of outstanding mechanical properties. The polyvinyl alcohol solution was withdrawn from beneath the film and the Congo red solution from above the film, and the two solutions used again to produce additional films by the same procedure.

The process of the invention is applicable to polyvinyl alcohol and its water soluble derivatives in pulverized, pasty, dissolved, fused, or plasticized form; likewise it may be applied to the treatment of finished articles produced from polyvinyl alcohol derivatives such as fibers, bands, films, plates, tubes, capsules, pressed articles and the like; likewise to materials of this type to which have been added softening agents, fillers, pigments or other plastic masses such as other polyvinyl compounds, condensation products, cellulose derivatives, and in fact, all types of modifying ingredients such as are commonly used in plastic technique. In this connection, one of the important advantages of the process of the invention resides in the fact that it makes it possible in many cases to obtain the benefit of a desired modifying action of an added ingredient and, at the same time, to inhibit other undesired modifications produced by the same ingredient. Thus, for example, softening agents may be added to the plastic composition without at the same time producing undesired effects on the solubility characteristics of the mass. Furthermore, the gradual nature of the insolubilizing action makes it possible to secure either a superficial hardening or the entire object may be thoroughly insolubilized throughout as desired.

In some instances it is desirable to combine the insolubilizing action of metal compounds with that of dyes or to further modify the course of the insolubilizing action by the use of anhydrides, aldehydes, and the like, or to subject the articles to photo-chemical action or thermal treatment during or subsequent to the treatment with the insolubilizing agent.

We claim:

1. A method of modifying the viscosity or water-solubility of a composition comprising a water soluble polymerized vinyl compound selected from the group consisting of polyvinyl alcohol and its partially saponified esters, ethers, and acetals, which comprises subjecting said composition to the action of Congo red.

2. A method of modifying the viscosity or water-solubility of a composition comprising a water-soluble polymerized vinyl compound which comprises subjecting said composition to the action of Congo red.

3. A method of modifying the viscosity or water-solubility of a composition comprising polyvinyl alcohol which comprises subjecting said composition to the action of Congo red.

4. As a new composition of matter, a polyvinyl compound treated with Congo red.

5. As a new composition of matter, polyvinyl alcohol treated with Congo red.

6. An article comprising a normally water-soluble polyvinyl compound having a surface superficially hardened by the action of Congo red.

7. An article comprising polyvinyl alcohol having a surface superficially hardened by the action of Congo red.

8. A method of forming films which comprises contacting a solution or suspension of a water-soluble polyvinyl compound with a solution of Congo red, thereby forming a film at the liquid inter-face, and withdrawing the thus formed film from the said liquid inter-face.

9. A method of forming films which comprises contacting a solution or suspension of polyvinyl alcohol with a solution of Congo red, thereby forming a film at the liquid inter-face, and withdrawing the thus formed film from the said liquid inter-face.

WILLY O. HERRMANN.
WOLFRAM HAEHNEL.